United States Patent [19]
Elias

[11] Patent Number: 4,901,949
[45] Date of Patent: Feb. 20, 1990

[54] ROCKET-POWERED, AIR-DEPLOYED, LIFT-ASSISTED BOOSTER VEHICLE FOR ORBITAL, SUPRAORBITAL AND SUBORBITAL FLIGHT

[75] Inventor: Antonio L. Elias, Fairfax, Va.

[73] Assignee: Orbital Sciences Corporation II, Fairfax, Va.

[21] Appl. No.: 167,189

[22] Filed: Mar. 11, 1988

[51] Int. Cl.$^4$ .............................................. B64C 3/38
[52] U.S. Cl. .................................... 244/49; 244/63
[58] Field of Search ............... 244/2, 3.1, 3.22, 3.23, 244/3.24, 3.25, 3.26, 3.27, 49, 63

[56] References Cited

U.S. PATENT DOCUMENTS

| | | |
|---|---|---|
| 3,702,688 | 11/1972 | Faget . |
| 3,866,863 | 2/1975 | von Pragenau . |
| 3,929,306 | 12/1975 | Faget . |
| 4,265,416 | 5/1981 | Jackson . |
| 4,306,692 | 12/1981 | Kaplan . |
| 4,410,151 | 10/1983 | Höppner et al. ................ 244/49 |
| 4,657,210 | 4/1987 | Hubert . |
| 4,659,038 | 4/1987 | Hoeppner . |
| 4,691,880 | 9/1987 | Frank ................................ 244/49 |

FOREIGN PATENT DOCUMENTS 1043516  11/1953  France .

OTHER PUBLICATIONS

P. Klass, "Increased Use of Mini-RPVs Foreseen", *Aviation Week & Space Technology*, Jul. 17, 1976, p. 58.
B. Elson, "Miniature RPV Passes Air-Launch Tests", *Aviation Week & Space Technology*, Dec. 15, 1975, p. 40.
P. Klass, "Mini-RPV Program Spawns Wide Range of Vehicles", *Aviation Week & Space Technology*, Jul. 14, 1975, p. 49.
B. Guenther, J. Miller & T. Panopalis, "North American X-15/X-15A-2", *Aerofax Datagraph 2*, Stock No. 0302, 1985.
J. Rix, "Freight Train to Space", *Spacewatch*, Nov. 1987, p. 12.
R. Hawkes, "X-15/b-52 Studied as Blue Scout Boosters," *Aviation Week & Space Technology*, Oct. 23, 1961.

*Primary Examiner*—Sherman D. Basinger
*Assistant Examiner*—Stephen P. Avila
*Attorney, Agent, or Firm*—Kirkland & Ellis

[57] ABSTRACT

A rocket-powered, air-deployed, lift-assisted booster vehicle (ALBV) is disclosed for efficiently carrying small payloads to orbital, supraorbital or suborbital altitudes and velocities. The ALBV is secured beneath a conventional carrier aircraft and dropped therefrom at launch altitude and velocity, which contributes significant total energy to the ALBV's ascent trajectory. The ALBV has wings, which generate aerodynamic lift to assist in vehicle ascent, and tail fins, which perform attitude control while the vehicle is in the sensible atmosphere. After drop launch, an innovative "vertical-S" maneuver is performed using aerodynamic control, causing the ALBV to ascend on a near-theoretical optimal trajectory. In the preferred embodiment, the wings and tail fins are jettisoned as the vehicle exits the sensible atmosphere and aerodynamic lift ceases. This invention represents a dramatic improvement over prior art approaches to orbital payload launch, as it approximately doubles the useful payload that can be carried by the booster compared to identical ground-launched vehicles.

47 Claims, 5 Drawing Sheets

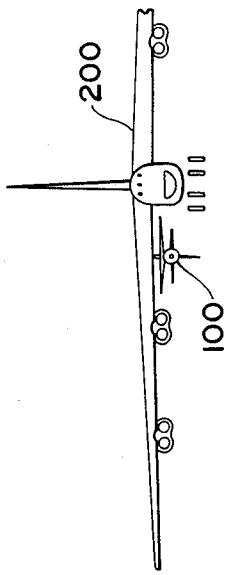
Fig. 6
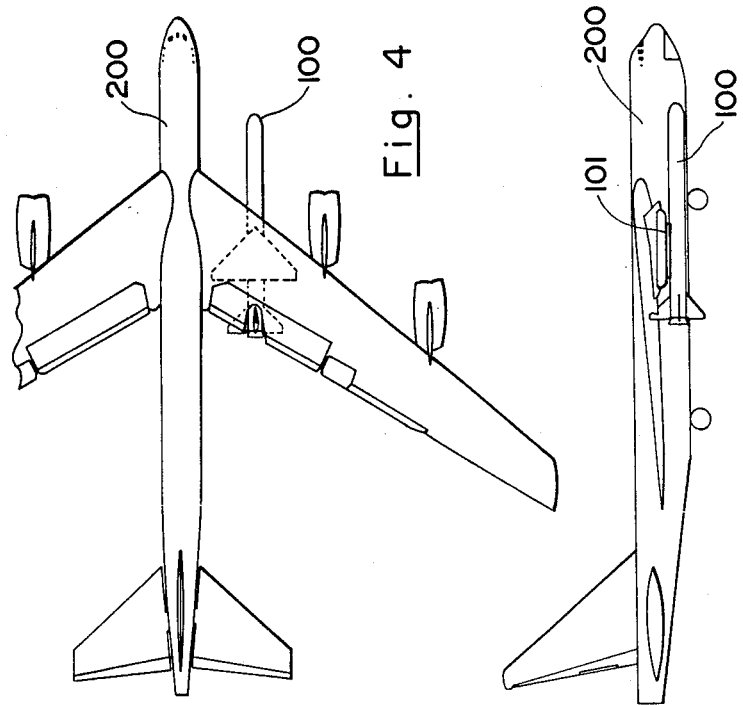
Fig. 4
Fig. 5

ROCKET-POWERED, AIR-DEPLOYED, LIFT-ASSISTED BOOSTER VEHICLE FOR ORBITAL, SUPRAORBITAL AND SUBORBITAL FLIGHT

BACKGROUND OF THE INVENTION

This invention relates to a winged rocket vehicle, and to a method of using the same to efficiently and safely transport payloads to orbital, supraorbital (i.e., Earth escape) or suborbital altitudes and velocities. More specifically, the present invention pertains to a rocket-powered, air-deployed, lift-assisted booster vehicle (ALBV) and to a method of launching the same, which dramatically reduce the amount of rocket propellant and related equipment required to achieve final altitude and velocity for a booster of given payload weight and level of propulsion system technology. In fact, with the current state-of-the-art in space launch vehicle technology, the present invention reduces the total weight of the booster by approximately 50% compared to a comparable ground-launched booster for a given payload weight, with a corresponding reduction in launch system cost.

There is a substantial and continuing commercial and government demand for efficient, economical and reliable payload-carrying space launch vehicles and methods. Numerous prior art approaches to launch payloads into space have been undertaken, but to date, all represent significant compromises regarding safety, economy, reliability and operational flexibility considerations.

Conventional ground-launched ballistic (i.e., non-lifting) booster rockets are the most common prior art approach to payload launch. However, such rockets require complex vertical takeoff facilities, including launch pad apparatus, and are subject to severe operational and geographical restrictions necessitated by the hazards of propellants and flight over populated areas.

Moreover, conventional ground-launched boosters suffer from inherent inefficiencies resulting from a compromise of competing design and operational considerations. These inefficiencies necessarily increase the size, complexity and cost of such systems, making them uneconomic or otherwise undesirable for certain applications.

One such set of competing considerations is the compromise between thrust direction losses and drag losses in conventional ground-launched ballistic boosters. In particular, because the final flight attitude for circular and elliptical orbits, as well as most other missions of interest, is horizontal or substantially horizontal, conventional, vertically launched rockets must pitch over from their initial vertical ascent to a near-horizontal ascent to achieve final orbital flight attitude. Achieving orbit requires high velocity and near-horizontal flight. To minimize losses associated with such thrust direction change (i.e., "thrust direction losses"), pitch-over should ideally occur while the vehicle is ascending at a relatively low velocity, resulting in a near-horizontal ascent early in the trajectory. A shallow ascent profile of this nature was utilized, for example, under zero atmosphere conditions (i.e., in vacuum) by the U.S. Apollo Program Lunar Module to achieve lunar orbit after liftoff from the moon's surface.

Structural stress and aerodynamic heating considerations, however, preclude the implementation of this ideal flight path in applications where the vehicle is being launched through an atmosphere. Aerodynamic forces, including drag and lift forces, increase with the parameter $\rho V^2$, where $\rho$ is the atmospheric density and V is vehicle velocity and the product $\frac{1}{2}\rho V^2$ is the dynamic pressure. Accordingly, for a given velocity, greater drag forces are experienced at lower altitudes than at higher altitudes, since $\rho$ is greater at such lower altitudes. Because $V^2$ continuously increases as the vehicle accelerates during booster rocket flight, and $\rho$ continuously decreases as the vehicle ascends, it is desirable to ascend as near to vertical as possible until the dynamic pressure reaches a maximum value, thereby minimizing the peak aerodynamic load on the vehicle. Accordingly, unlike the zero atmosphere ascent of the Lunar Module, aerodynamic load considerations dictate that conventional ground-launched boosters be launched vertically, with most of the pitch-over from the vertical to the final flight attitude occurring only after $\rho V^2$ reaches its maximum value. Consequently, pitch-over occurs at a point where V is extremely high (and $\rho$ is low), reducing aerodynamic load on the vehicle at the expense of substantial excess propellant usage attributable to thrust direction losses.

In addition, because the conventional ballistic booster spends a significant portion of its flight time in a vertical or near-vertical attitude, the force of gravity directly counteracts the vehicle thrust forces, resulting in other losses, commonly referred to as "gravity losses." Although gravity losses are reduced as a vehicle approaches horizontal flight, the aerodynamic load considerations discussed above preclude substantial horizontal flight of the vehicle until after a maximum value of $\rho V^2$ is achieved. Consequently, the conventional booster vehicle incurs substantial gravity losses for a significant portion of its ascent trajectory.

Furthermore, booster rocket motor efficiency increases with increasing exhaust nozzle expansion ratio or nozzle exit area. However, ambient atmospheric pressure forces acting upon the rocket motor nozzle exit are reduce net engine thrust as nozzle area increases. This thrust loss, commonly referred to as "atmospheric pressure-induced thrust reduction," necessitates the design of conventional boosters with nozzle exit areas or expansion ratios providing less than peak motor propulsive efficiency in order to reduce atmospheric pressure-induced thrust reduction and to maximize the net thrust in the denser (lower) regions of the atmosphere.

As is apparent from the foregoing, thrust direction losses, drag losses, gravity losses and atmospheric pressure-induced thrust reduction losses involve complex competing considerations resulting in less than optimum booster performance and flight path maneuvering. Such performance and maneuvering trade-offs greatly increase the size, complexity and expense of conventional boosters for a given payload weight.

To overcome these drawbacks, the present invention proposes launching a lifting-ascent booster vehicle from an aircraft at high altitude and velocity. Launching a booster vehicle from a carrier aircraft while in flight provides the substantial additional advantage of adding the trajectory contributions of the aircraft's velocity and altitude (kinetic and potential energy) directly to the ascent energy of the booster. These trajectory contributions are unavailable for ground-launched booster vehicles.

Another disadvantage of ground-launched vehicles is that the angle of inclination of the resultant orbit relative to the equator is constrained by the latitude of the launch location and by range considerations which limit the direction of launch (i.e., the launch path must not cross populated areas). One of the advantages of launching from an aircraft in flight is that the velocity vector of the aircraft can be aligned with the plane of the final, desired orbit. This is accomplished by flying the carrier aircraft to the desired launch location (at any desired latitude, usually over ocean areas) and giving it the desired velocity vector prior to drop. The principal advantage of being able to fly to the desired location and latitude and in the direction of the desired orbit is that the booster vehicle does not have to perform an energy-consuming inclination change maneuver to achieve the desired orbital inclination, which is much less efficient than using a carrier aircraft to effect the same maneuver.

Another advantage of air-launching over ground launching is the ability to fly to a launch site at any location having favorable weather conditions at the time of launch. Ground launches typically are restricted to only a few selected sites due to safety and security considerations and the availability of the required launch facilities, which usually are at fixed locations. Thus, air launches are less likely than ground launches to be delayed or cancelled due to unfavorable weather conditions.

Various configurations of horizontally launched vehicles have been proposed. However, as will be seen, none provide the advantages in design and operation provided by the present invention.

Jackson, et al., in U.S. Pat. No. 4,265,416, disclose one such system wherein a reusable, winged orbital vehicle is assisted in horizontal ground launch from a runway by one or more reusable, turbojet-propelled, winged booster vehicles that are releasably connected to the orbital vehicle for launch. The boosters assist the rocket-powered orbiter in ascending to staging altitude, and are thereafter released to fly back to Earth for horizontal landing and reuse. The reusable nature of this vehicle requires that it be capable of reentering the atmosphere and using wings to fly back to and land on a runway. In this vehicle, both orbiter and booster wings provide lift, which would have the effect of overcoming gravity losses to some extent. The large size and technical complexity of the disclosed launch vehicle, however, would render it enormously expensive to design, develop and test, and impractical and cost-prohibitive for launching small orbital payloads, e.g., less than 1,000 pounds in weight. Moreover, the size and complexity of the structure, due in large part to its reusable configuration, decrease the payload capacity of the vehicle.

Another launch system using a carrier aircraft to launch a winged booster vehicle while in flight has been proposed by Teledyne Brown Engineering. That system comprises an unmanned spaceplane adapted for horizontal launch from atop a conventional aircraft, such as a Boeing-747. This proposed "piggy-back" technique, however, contemplated starting and testing the spaceplane booster engines while the vehicle is still attached atop the carrier aircraft. Such launching methods are extremely hazardous, substantially limiting wide-scale adoption of this approach. In addition, the system also employs a booster vehicle having wings that remain with the vehicle, which would diminish the payload capacity of the vehicle.

Avoiding the hazards associated with launching from atop a carrier aircraft, certain high-speed research aircraft, e.g., the NASA/North American X-15, have been launched from the underside of carrier aircraft. To date, however, actual underside air launches have been limited to relatively low Mach number, suborbital vehicles, and no vehicle capable of orbital flight has been designed which is suitable for air deployment from a carrier aircraft. The X-15 vehicle attains only about 20% of the energy needed to achieve an orbital trajectory. Furthermore, neither the X-15 nor other aircraft-dropped, rocket-propelled vehicles had two, separable stages, the first providing propulsion as well as lift and aerodynamic control of the trajectory and the second providing propulsion and thrust control of the trajectory. In addition, the reusable configuration of the X-15 vehicle required additional complexity to enable it to survive reentry to the atmosphere and to land on horizontal runways.

There are a number of prior art missiles carried by and launched from carrier aircraft while in flight, including air-to-air and air-to-ground missiles. Such missiles, however, are not designed to leave the atmosphere, do not achieve either orbital speed or altitude, and attain only about 5% of the energy needed to achieve an orbital trajectory. Furthermore, in such missiles the wings and other aerodynamic control surfaces are not jettisoned after ascending to beyond the atmosphere.

It is therefore an object of the present invention to establish an efficient method of launching an orbital, supraorbital or suborbital rocket booster vehicle which reduces the adverse consequences of thrust direction losses, drag losses, gravity losses and atmospheric pressure-induced thrust reduction losses.

It is a further object of the present invention to provide a vehicle which can take advantage of the trajectory energy contributions of a carrier aircraft to increase its payload capacity to Earth orbit and other desired trajectories.

It is still a further object of the present invention to provide a vehicle having expendable wings to reduce vehicle cost and complexity and increase payload capacity.

It is still a further object of the present invention to provide a vehicle for economically and reliably injecting both small and large payloads into orbit.

It is a further object of the invention to provide an orbital, supraorbital or suborbital rocket vehicle that does not require vertical takeoff facilities, and is geographically unrestricted as to its mission departure location, launch location and azimuth, and final orbit inclination, thereby avoiding or minimizing concerns about weather, safety, security and the availability of facilities at a fixed location, which greatly affect the time and location of ground launches.

It is still a further object of the invention to provide a rocket vehicle satisfying the above-mentioned objects which is based on 1988 state-of-the-art propulsion, structures and avionics technologies and devices.

Other objects and advantages will be readily apparent from the following description and drawings which illustrate and described preferred embodiments of the present invention and method of using the same.

SUMMARY OF THE INVENTION

The present invention pertains to an unmanned, expendable rocket vehicle advantageously designed for air launch from the underside of a carrier aircraft to deliver small or large payloads to orbital, supraorbital or suborbital velocities and altitudes. The rocket vehicle includes a wing and controllable fins which provide aerodynamic lift and attitude control, respectively, while the vehicle is traveling in the sensible atmosphere. In a preferred embodiment of the invention, a plurality of stages are utilized, and the wing is expendable and is attached to a first stage of the vehicle for jettison with that stage.

In operation, the rocket booster vehicle is mounted to the underside of the wing or fuselage of a carrier aircraft, e.g., a Lockheed C-130, Boeing B-52, Boeing 757 or a special purpose aircraft, and is carried to altitude for drop launch. The vehicle is thereafter released from the carrier aircraft in a horizontal or near-horizontal attitude, and the first stage is ignited. In alternative embodiments of the present invention, the vehicle may be carried inside the carrier aircraft rather than mounted to the underside of the wing or fuselage. Thereafter, the vehicle performs an innovative "vertical-S" maneuver, comprised of an initial aerodynamically controlled pitch-up to an ascent flight path angle preferably of less than about 45°, followed by a subsequent aerodynamically controlled pitch-down of the vehicle after a maximum value of $\rho V^2$ is reached. In the final portion of the vertical-S maneuver, first stage burnout occurs, the first stage and connected aerodynamic wing and fin surfaces are jettisoned and the second and any subsequent stages accelerate the vehicle to orbital, supraorbital or suborbital altitudes and velocities in a conventional way.

Significant advantages over prior art vehicles and launch methods are achieved by the vehicle and method described above, which render the present invention feasible for wide-scale orbital, supraorbital or suborbital payload transport.

By launching the booster vehicle from a carrier aircraft while in flight, the carrier aircraft's velocity and altitude (kinetic and potential energy) add directly to the ascent energy of the booster vehicle.

Because of the advantageous use of aerodynamic lift, the present invention may be designed to a size and configuration permitting horizontal deployment from a carrier aircraft at high altitudes (e.g., 40,000 feet) and velocities (e.g., 0.80 Mach number). As will be appreciated from the foregoing, aerodynamic lift is utilized to assist the rocket booster in the non-vertical ascent of the vehicle through the sensible atmosphere. In addition, while in the sensible atmosphere, trajectory control is performed by attitude control of the aerodynamic surfaces of the vehicle. Consequently, the aerodynamic lift assists in overcoming gravity losses, which have heretofore been counteracted primarily by the thrust of the rocket boosters in conventional booster vehicles. Moreover, thrust direction losses are reduced since the total velocity vector turning angle is much smaller than that of a ground-launched vehicle, most of the turning is effected at low speeds and a significant amount of turning is achieved with aerodynamic lift.

Moreover, the launch of the orbital vehicle at high altitude, when followed by the above-described vertical-S maneuver, enables the vehicle of the present invention to fly an ascent trajectory which differs from both the ideal no-atmosphere horizontal launch trajectory and the near-vertical trajectory typically used for ground launches in the Earth's atmosphere described above, and which avoids the attendant disadvantages normally associated with launches within the atmosphere. In particular, the low atmospheric density $\rho$ at the launch altitude and relatively low velocity at the deployment point minimize aerodynamic and aerothermodynamic loads on the structure, enabling use of a substantially non-vertical flight path. In the preferred method, an initial pitch-up of 45° or less provides a suitable atmospheric density gradient to avoid destructive peak aerodynamic and heating loads. Moreover, after peak aerodynamic load is reached, the vehicle is pitched down to approach the ideal horizontal, in-vacuum trajectory discussed above.

Additionall, because a substantially non-vertical flight path is feasible, gravity losses are further reduced as the gravity force component in the thrust direction is decreased and the gravity force component perpendicular to that direction is counterbalanced by the wings' aerodynamic lift.

Furthermore, jettisoning of the wing and fins after they cease providing useful lift and aerodynamic attitude control further increases vehicle efficiency and increases payload capacity compared to, say, the U.S. Space Shuttle or the Jackson, et al. vehicle described above, which must carry their non-expendable wings all the way to orbit.

Also, air launch of the vehicle permits any desired orbital inclination to be achieved efficiently because the launch can occur at any desired latitude and angle of inclination, thereby obviating the need for any inclination change maneuver during booster ascent or after orbit is reached.

Still further loss reductions are achieved in the design of the rocket motors of the present invention. Because the motors are fired only at atmospheric pressures at 40,000 feet and upwards, larger nozzle exit areas with higher expansion ratios may be employed, improving propulsive efficiency and greatly reducing atmospheric thrust reduction losses.

BRIEF DESCRIPTION OF THE DRAWINGS

FIG. 4 is a top view of a representative carrier aircraft with the rocket vehicle of the present invention secured thereto;

FIG. 5 is a side view of the carrier aircraft with the rocket vehicle of the present invention secured thereto;

FIG. 6 is a front view of the carrier aircraft with the rocket vehicle of the present invention secured thereto;

DETAILED DESCRIPTION OF THE INVENTION

Figure 3:
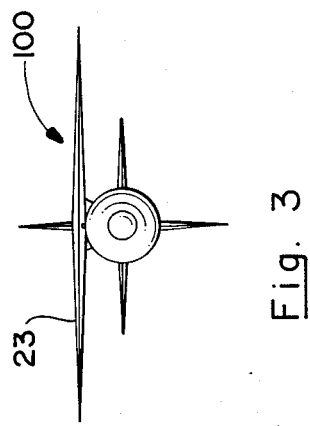
FIG. 3 is a front view of the first preferred embodiment of the rocket vehicle of the present invention.
Figure 1:
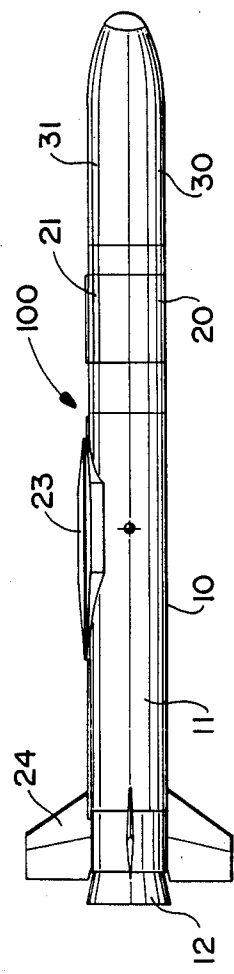
FIG. 1 is a side view of the first preferred embodiment of the rocket vehicle of the present invention.
Figure 2:
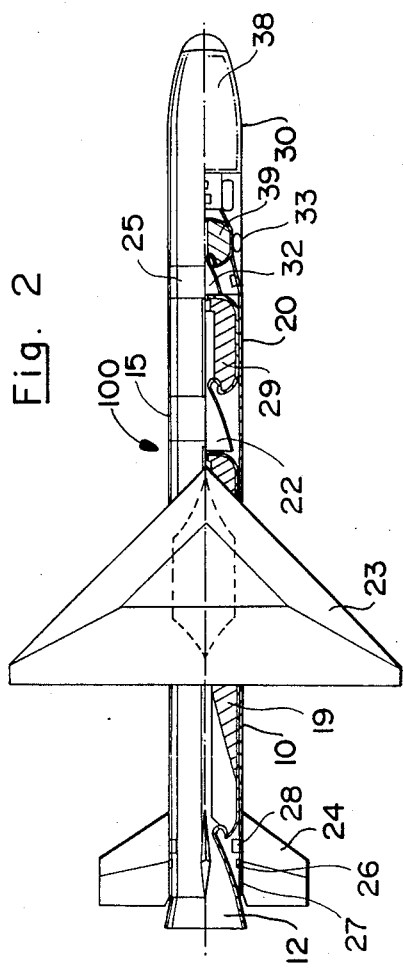
FIG. 2 is a partial sectional plan view of the first preferred embodiment of the rocket vehicle of the present invention.

FIGS. 1-3 show a first preferred embodiment of the rocket vehicle 100 of the present invention, which is a rocket-powered, air-deployed, lift-assisted booster vehicle. The ALBV is comprised of first stage 10, second stage 20 and third stage 30 having first, second and third stage rocket motors 19, 29 and 39, respectively. First and second stages 10, 20 are initially joined at adjacent ends via 1-2 adapter 15 in a conventional manner for selective release upon expiration of the first stage in flight. Second and third stages 20, 30 are similarly joined at adjacent ends via 2-3 adapter 25 for selective release upon expiration of the second stage in flight.

In the preferred embodiment, the first, second and third stages may be solid rocket motors fueled by an appropriate propellant, such as high energy HTPB (hydroxy terminated polybutadyne) based propellant. The casing 11 of the first stage is preferably steel or filament composite (e.g., graphite) for strength and overall vehicle weight reduction, the selection depending on both economic and technical considerations, and casings 21 and 31 of the second and third stages, respectively, are preferably filament composite. Nozzles 12, 22 and 32 are secured aft of the first, second and third stages, respectively. First stage nozzle 12 is a fixed (i.e., not gimballed) nozzle optimized for air launch, preferably having a nozzle expansion ratio of approximately 40:1. Second and third stage nozzles 22 and 32 are conventional gimballed nozzles, preferably having expansion ratios of approximately 80:1 and 60:1, respectively.

Conventional attitude control mechanisms are employed in the second and third stages, which may be, for example, electromechanical thrust vector control means for pitch and yaw control in powered flight and cold gas (e.g., nitrogen) reaction control jets for pitch and yaw control in coast flight and roll control in powered and coast flight. Attitude control of the first stage is aerodynamically performed in a manner described below.

Aerodynamic wing 23 is secured to first stage casing 11. Fins 24 provide aerodynamic control of the vehicle and are mechanically pivotable supported by fin actuators 26 in aft skirt 27. Electric batteries or pressurized hydraulic reservoirs 28 are provided to power fin actuators 26. Aft skirt 27 is secured to casing 11 via conventional extension members (not shown). Avionics for flight control, including a microprocessor guidance computer and inertial attitude reference instruments, are located within a third stage avionics assembly 31 surrounding the smaller diameter third stage motor 39.

Third stage fairing 38 is a conventional booster aerodynamic/heat shield fairing, except that it covers both the payload and the entire third stage. The payload (not shown) is stored within a chamber defined by the forward portion of fairing 38. Fairing 38 is adapted for ejection via a conventional ejection mechanism, normally after second stage ignition, but with the exact timing depending upon mission and trajectory requirements.

FIGS. 4–6 illustrate the above-described ALBV 100 mounted to the carrier aircraft 200 via an underwing launch pylon and release mechanism 101. Carrier aircraft 200 may be any suitable aircraft, e.g., a Lockheed C-130, Boeing B-52, Boeing 757 or a special purpose aircraft. Although the ALBV 100 may be mounted at any convenient location, it is preferably mounted to the carrier aircraft wing, between the inboard engine and the fuselage, at a distance optimized for propeller/engine clearance, aerodynamic interference and ground clearance during takeoff rotation. For carrier vehicle safety, suitable fail-safe means should be included in the pylon structure to ensure that the booster can be ejected, even if there is a failure of the primary release mechanism.

Figure 7:
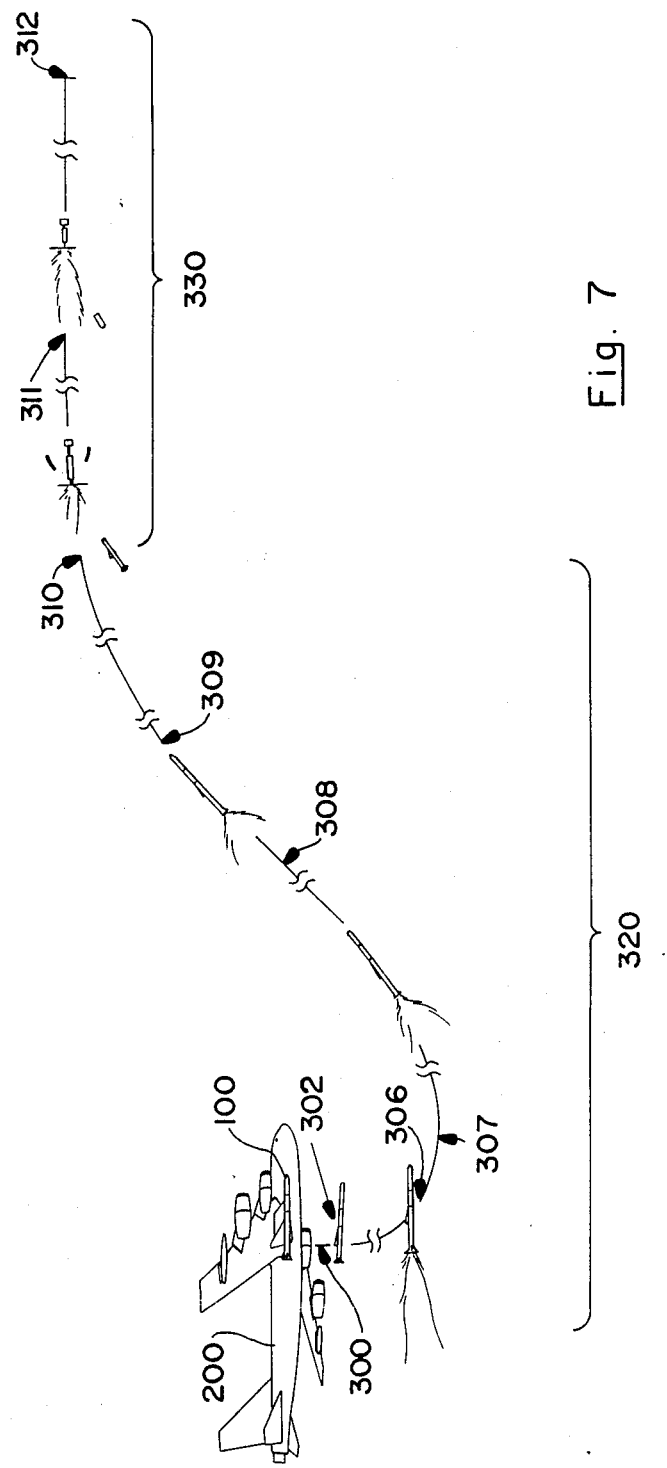
FIG. 7 is a schematic diagram illustrating the launch method of the rocket vehicle of the present invention.

With reference to FIG. 7, an exemplary mission profile is described below.

Before takeoff of carrier aircraft 200, ALBV 100 is mounted to carrier aircraft 200 via underwing launch pylon 101. Carrier aircraft 200 thereafter takes off from conventional horizontal take-off (i.e., runway) facilities and proceeds to the drop-launch site. Because the ALBV 100 is adapted for air launch, the mission origination point for carrier aircraft 200 is limited only by the availability of suitable conventional airfield facilities and the range of the carrier aircraft 200. Moreover, the air launch location and direction of the ALBV 100 is flexible, providing substantial flexibility in spent stage splashdown area and orbital injection point selection.

Upon reaching the launch point 300 and conducting appropriate checkout tests and other functions, at $t=0$ seconds ALBV 100 is air-launched at subsonic velocities (e.g., Mach number of approximately 0.80) at an altitude of approximately 40,000 feet in a substantially horizontal attitude. After a safe separation from carrier aircraft 200, there is a free-fall phase through point 302 while the ABLV 100 establishes its own flight and then at point 306 (e.g., $t=5$ seconds) the first stage motor 19 ignites.

ALBV aerodynamic control surfaces on fins 24 are thereafter placed in a configuration that produces a pitch-up attitude of ALBV 100 (defining a positive angle of attack) at point 307, initiating the vertical-S maneuver and aerodynamically causing ALBV 100 to climb at an angle of ascent that preferably is less than about 45 degrees. The angle of ascent is selected as the shallowest angle of ascent that results in an acceptable maximum aerodynamic load on the vehicle. Since the aerodynamic and heating loads are directly related to dynamic pressure, the steeper the angle, the lower the aerodynamic and heating loads. On the other hand, the shallower the angle, the lower will be the thrust direction losses and gravity losses, as discussed above.

At point 308 (e.g., $t=30$ seconds, $V=$Mach 3.0, altitude=78,000 feet) the ALBV aerodynamic control surfaces on fins 24 are placed in a configuration causing ALBV 100 to pitch down, thereby decreasing its ascent flight path. Point 308 is determined to be the point where the parameter $\rho V^2$ has reached its maximum value, and corresponds to the point of peak aerodynamic load on ALBV 100. The dynamic pressure $\frac{1}{2}\rho V^2$ varies over time after launch because the altitude of ALBV 100 is increasing (causing $\rho$ to decrease) and the velocity of ALBV 100 is increasing. Thus, when plotted as a function of time after launch, dynamic pressure first increases and then decreases such that the plot resembles a parabolic curve.

It should be noted that if the "push-over" point 308 is selected at too low an altitude (i.e., where $\rho$ is still too high), the resulting higher value of $\rho V^2$ will require heavier structure to support aerodynamic loads, which will reduce payload capacity. If point 308 is selected at too high an altitude, increased gravity losses due to the steeper trajectory will reduce the available payload capacity. Point 308 marks the point of the vertical-S maneuver with the optimum altitude and velocity for push-over. After point 308, unimpeded acceleration of ALBV 100 is possible at the theoretical optimal ascent angle without regard for aerodynamic load considerations.

At point 309 (e.g., t=95 seconds, V=10,300 fps, altitude=260,000 feet), first stage burnout and jettison occur, whereupon, in the preferred embodiment, expendable wing 23, fins 24 and fairing 38 are jettisoned with the first stage. Depending upon the altitude at which the jettisoning occurs, wing 23, fins 24, fairing 38 and the rest of the burned out first stage 10 are burned up in the atmosphere upon reentry or drop into the ocean, in the preferred embodiment. Preferably, first stage burnout is determined to occur with at least 10 psf of dynamic pressure to insure that efficient aerodynamic attitude control with the fins 24 is available through burnout of first stage motor 19.

Points 300-309 represent a first phase 320 of the flight of ALBV 100, during which the trajectory is exclusively aerodynamically controlled. As discussed above, aerodynamic control during this phase significantly enhances first phase efficiency by greatly reducing thrust direction losses. Furthermore, because of the aerodynamic control, gimballed first stage nozzles or other means of controlling attitude are not required, thereby reducing vehicle weight and cost.

After first stage burnout (point 309), second stage ignition occurs at point 310 (e.g., t=135 seconds) after an optimal coast period.

Third stage ignition occurs at point 311 (e.g., t=610 seconds) and third stage burnout and orbital insertion follow at point 312 (e.g., t=675 seconds).

Figure 8A:
FIGS. 8a and 8b show how positive and negative angles of attack are defined, respectively.
Figure 8B:
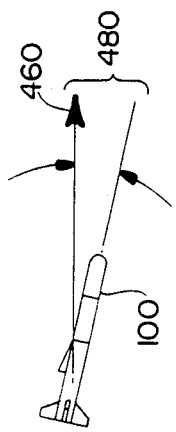
Figure 9:
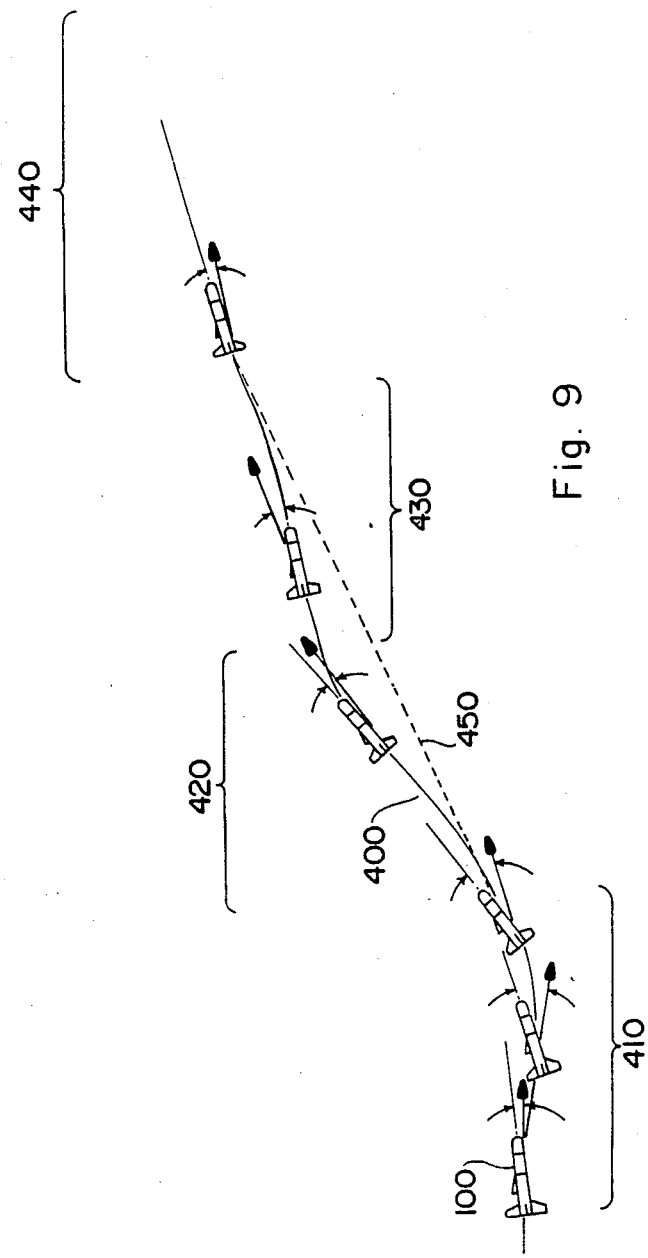
FIG. 9 is a schematic illustration of the preferred trajectory of the rocket booster vehicle showing where the vehicle has positive and negative angles of attack.

The description of the preferred trajectory for air launching a rocket booster vehicle from a carrier aircraft as set forth above is illustrated in FIGS. 8 and 9. Referring first to FIGS. 8a and 8b, there is shown the definitions of positive and negative angles of attack. The angle of attack is defined as the angle between the velocity vector 460 and the body axis of the rocket vehicle 100. In FIG. 8a, a positive angle of attack 470 is shown because the body axis is above the velocity vector 460. In FIG. 8b, a negative angle of attack 480 is shown because the body axis is below the velocity vector 460.

These definitions of angles of attack are used in understanding the preferred trajectory of the rocket booster. In FIG. 9, the preferred trajectory is described in terms of positive and negative angles of attack. The rocket booster 100 starts with a region of increasing positive angle of attack 410 after release from the carrier aircraft. This increasing angle turns into a region of decreasing angle of positive attack 420. The decreasing angle of positive attack results from the rocket booster 100 leaving the optimal vacuum trajectory 450 and following the actual trajectory 400. After the region of decreasing positive angle of attack, the rocket booster turns into a region of negative angle of attack 430. This region continues until the rocket booster returns to the optimal vacuum trajectory 450 and passes into the ballistic flight region 440. In the ballistic flight region 440, there is a positive, negative or zero angle of attack.

Points 310-312 represent a second phase 330 of the trajectory, during which conventional (non-aerodynamic) attitude control means, as discussed above, are utilized.

As will be apparent to those skilled in the art, many modifications of the present invention are possible without departing from the spirit of the invention. By way of example only, a different number of stages could be used depending on such factors as desired mission destination, payload weight, cost considerations and carrier aircraft type and configuration. Moreover, although described as solid propellant motors herein, one or more stages could include other types of rocket propulsion, including conventional liquid propellant engines. Also, the present invention could be used with a variety of types of carrier aircraft and a variety of drop mechanisms.

Furthermore, although the preferred embodiment incorporates wing 23 and fins 24 on the first stage, wing 23 and fins 24 need not be so located, and could instead be placed at any other aerodynamically suitable location, i.e., on a zero stage or on a second or subsequent stage where aerodynamically suitable. Furthermore, in applications where vehicle size or payload capacity is not critical, wing 23 and fins 24 need not be jettisoned. In applications utilizing only a single stage or multiple stages, the wing 23 and fins 24 may be jettisoned by themselves, rather than in conjunction with the jettisoning of a burned-out stage. In such applications, however, suitable safeguards should be taken to ensure that the discarded wing 23 and fins 24 clear ALBV 100 to avoid damage thereto. To this end, conventional explosive mounts could be implemented to secure the wing 23 and fins 24 to ALBV 100.

Finally, although the operation of ALBV 100 is herein described with reference to a specific mission profile, the times, altitudes, velocities and sequence of certain events are exemplary only, and may be modified to account for such factors as weather, type of carrier aircraft, type of payload, desired mission destination and ALBV configuration (e.g., number of stages, types of motors/engines employed, wing jettison method, etc.).

It will be appreciated by those skilled in the art that the present invention is not limited to the precise embodiments disclosed, and that various additional changes to ALBV 100, carrier aircraft 200 and launch methods described herein could be made without departing from the scope and spirit of the present invention.

What is claimed is:

1. A rocket booster vehicle adapted for launch by being released from a carrier aircraft while in flight, comprising:
   thrust means for propelling and providing trajectory control of said vehicle;
   expendable wing means for providing aerodynamic lift and trajectory control for said vehicle; and
   carrying means for releasably carrying said vehicle with said carrier aircraft;
   wherein said wing means provides trajectory control during a first predetermined period after release by said carrying means of said vehicle from said carrier aircraft, and said thrust means provides trajectory control after said first predetermined period.

2. A rocket booster vehicle as set forth in claim 1, further comprising detachment means for separating said wing means from said vehicle.

3. A rocket booster vehicle as set forth in claim 2, wherein said vehicle further comprises at least first and second stages and said thrust means further comprises first stage thrust means and second stage thrust means carried by said first and second stages, respectively, said wing means being secured to said first stage, and said detachment means further comprises means for separating said first stage and said wing means from said second stage.

4. A rocket booster vehicle as set forth in claim 3, wherein said vehicle further comprises a third stage, said thrust means further comprises third stage thrust means carried by said third stage and said detachment means further comprises means for separating said second stage from said third stage.

5. A rocket booster vehicle as set forth in claim 4, wherein said third stage further comprises payload means for carrying a payload with said vehicle.

6. A rocket booster vehicle as set forth in claim 1, wherein said attachment means releasably attaches said vehicle to the underside of said carrier aircraft.

7. A rocket booster vehicle as set forth in claim 1, wherein said wing means comprises main wing means for providing aerodynamic lift and auxiliary wing means for performing attitude control during said first predetermined period.

8. A rocket booster vehicle as set forth in claim 1, further comprising payload means for carrying a payload with said vehicle.

9. A rocket booster vehicle as set forth in claim 3, wherein said first stage thrust means has a fixed thrust direction, and said second stage thrust means has a variable thrust direction.

10. A rocket booster vehicle as set forth in claim 3, wherein said first stage thrust means has a fixed thrust direction, and said second stage thrust means has a plurality of different, selectable thrust directions.

11. A method of air launching a rocket booster vehicle by separating it from a carrier aircraft while in flight, wherein said vehicle has controllable wing means for providing aerodynamic lift and trajectory control and thrust means for propelling said vehicle, comprising the steps of:
  detachably mounting said vehicle to said carrier aircraft;
  flying said vehicle to a launch location;
  detaching said vehicle from said carrier aircraft at the launch location;
  initiating said thrust means to propel said vehicle;
  controlling said wing means to give said vehicle a positive angle of attack for a first time period to cause said vehicle to climb at an increasing angle of ascent during at least a portion of said first time period; and
  controlling said wing means to give said vehicle a negative angle of attack after the lapse of said first time period to cause said vehicle to climb at a decreasing angle.

12. The method of air launching a rocket booster vehicle from a carrier aircraft as set forth in claim 11, wherein after said vehicle has climbed at an increasing angle of ascent, said wing means is controlled to cause said vehicle to climb at a decreasing angle of ascent until a substantially horizontal angle of ascent is achieved.

13. The method of air launching a rocket booster vehicle from a carrier aircraft as set forth in claim 11, wherein said carrier aircraft flies on a predetermined azimuth at said launch location.

14. The method of air launching a rocket booster vehicle from a carrier aircraft as set forth in claim 11, wherein said first time period is the period beginning after said vehicle is separated from said carrier aircraft by a safe distance and ending at a time selected to minimize the peak aerodynamic load on said vehicle.

15. The method of air launching a rocket booster vehicle from a carrier aircraft as set forth in claim 11, further comprising the step of jettisoning said wing means at a time after said first time period has lapsed.

16. The method of air launching a rocket booster vehicle from a carrier aircraft as set forth in claim 11, further comprising the step of jettisoning said wing means after said vehicle reaches an altitude at which atmospheric density is less than a predetermined value.

17. The method of air launching a rocket booster vehicle from a carrier aircraft as set forth in claim 11, wherein said vehicle is mounted below a wing of said carrier aircraft and is dropped from said carrier aircraft.

18. The method of air launching a rocket booster vehicle from a carrier aircraft as set forth in claim 11, wherein said vehicle is mounted on the interior of said carrier aircraft and is dropped from said carrier aircraft.

19. The method of air launching a rocket booster vehicle from a carrier aircraft as set forth in claim 11, wherein said wing means performs trajectory control for a second time period, and said thrust means performs trajectory control after said second time period.

20. The method of air launching a rocket booster vehicle from a carrier aircraft as set forth in claim 19, wherein said second time period is the time period beginning at launch and ending when aerodynamic control becomes ineffective.

21. The method of air launching a rocket booster vehicle from a carrier aircraft as set forth in claim 20, further comprising the step of separating said wing means from said vehicle after said second time period has lapsed.

22. The method of air launching a rocket booster vehicle from a carrier aircraft as set forth in claim 11, wherein the angle of ascent of said vehicle after release never exceeds 45 degrees.

23. The method of air launching a rocket booster vehicle from a carrier aircraft as set forth in claim 11, further comprising the step of ensuring that the maximum angle of ascent of said vehicle is the shallowest angle resulting in an acceptable maximum aerodynamic load on said vehicle.

24. The method of air launching a rocket booster vehicle from a carrier aircraft as set forth in claim 11, further comprising the step of flying said carrier aircraft in the direction of the desired trajectory of the ascent of said vehicle such that the total energy of said vehicle at the time of launch contributes to the energy of said vehicle in the desired ascent trajectory.

25. The method of air launching a rocket booster vehicle from a carrier aircraft as set forth in claim 11, wherein after said vehicle has climbed at an increasing angle of ascent, said wing means is controlled to cause said vehicle to climb at a decreasing angle of ascent until the angle of ascent is less than a predetermined angle.

26. The method of air launching a rocket booster vehicle from a carrier aircraft as set forth in claim 11, wherein said vehicle is mounted below the fuselage of said carrier aircraft and is dropped from said carrier aircraft.

27. The method of air launching a rocket booster vehicle from a carrier aircraft as set forth in claim 11, wherein said vehicle is mounted above said carrier aircraft and is released from said carrier aircraft.

28. A method of air launching a rocket vehicle from a carrier aircraft, wherein said vehicle has controllable aerodynamic wing means for providing aerodynamic lift and trajectory control and thrust means for propelling said vehicle, comprising the steps of:
  launching said vehicle from said carrier aircraft;

increasing the altitude of said vehicle to a predetermined point on a trajectory by the lift and control provided by said wing means and the propulsion provided by said thrust means; and jettisoning said wing means at said predetermined point.

29. The method of air launching a rocket vehicle from a carrier aircraft as set forth in claim 28, wherein said predetermined point is at the altitude at which the atmospheric density becomes less than a predetermined value.

30. The method of air launching a rocket vehicle from a carrier aircraft as set forth in claim 28, wherein said predetermined point is where the dynamic pressure is less than a predetermined value.

31. A rocket booster vehicle adapted for air launch by being released from a carrier aircraft in flight, comprising:

expendable wing means for providing aerodynamic lift and trajectory control for said vehicle after launch from said carrier aircraft to lift and guide said vehicle along a predetermined ascending trajectory; and thrust means for propelling said vehicle along the trajectory; and attachment means for releasably attaching said vehicle to said carrier aircraft;

wherein said wing means provides trajectory control of said vehicle to a point on the trajectory at which dynamic pressure is less than a first predetermined value.

32. A rocket booster vehicle as set forth in claim 31, wherein said first predetermined value is the dynamic pressure at which aerodynamic control by said wing means becomes substantially ineffective.

33. A rocket booster vehicle as set forth in claim 31, further comprising detachment means for separating said wing means from said vehicle.

34. A rocket booster vehicle as set forth in claim 31, wherein said thrust means provides trajectory control after said point on the trajectory is reached.

35. A rocket booster vehicle as set forth in claim 31, wherein said vehicle further comprises at least first and second stages and said thrust means further comprises first and second thrust stages carried, respectively, by said at least first and second stages, said wing means being attached to said first stage, and further comprising separation means for separating said first stage and said wing means attached thereto from said second stage.

36. A rocket booster vehicle as set forth in claim 31, wherein said attachment means releasably attaches said vehicle to the underside of said carrier aircraft.

37. A method of air launching a rocket vehicle by separating it from a carrier aircraft while in flight, wherein said vehicle has controllable wing means for providing aerodynamic lift and trajectory control and thrust means for propelling said vehicle, comprising the steps of:

detachably mounting said vehicle to said carrier aircraft;

flying said vehicle to a launch location;

releasing said vehicle from said carrier aircraft at the launch location;

initiating said thrust means to propel said vehicle along an ascent trajectory;

controlling said wing means to give said vehicle a positive angle of attack to cause said vehicle to climb at an increasing angle of ascent along said ascent trajectory to a predetermined point on said ascent trajectory; and controlling said wing means to give said vehicle a negative angle of attack to cause said vehicle to climb along said ascent trajectory at a decreasing angle of ascent beyond said predetermined point.

38. The method of air launching a rocket booster vehicle from a carrier aircraft as set forth in claim 37, wherein said predetermined point is selected to minimize the aerodynamic load on said vehicle.

39. The method of air launching a rocket booster vehicle from a carrier aircraft as set forth in claim 37, further comprising the step of jettisoning said wing means after the dynamic pressure on said vehicle becomes less than a predetermined minimum value.

40. A method of air launching a rocket vehicle by separating it from a carrier aircraft while in flight, wherein said vehicle has controllable wing means for providing aerodynamic lift and trajectory control and controllable thrust means for propelling and providing trajectory control of said vehicle, comprising the steps:

detachably mounting said vehicle to said carrier aircraft;

flying said vehicle to a launch location;

detaching said vehicle from said carrier aircraft at the launch location;

initiating said thrust means to propel said vehicle;

controlling said wing means to guide said vehicle along a desired trajectory until the dynamic pressure is less than a predetermined value;

expending said wing means; and controlling said thrust means to propel and guide said vehicle along the desired trajectory beyond where said wing means are expended.

41. A rocket booster vehicle adapted for launch by being released from a carrier aircraft while in flight, comprising:

at least first and second stage thrust means for propelling and providing trajectory control of said vehicle;

expendable wing means for providing aerodynamic lift and trajectory control for said vehicle; and carrying means for releasably carrying said vehicle with said carrier aircraft;

at least first and second stages carrying said at least first and second stage thrust means, respectively, said wing means being secured to said first stage;

detachment means for separating said wing means from said second stage; and wherein said wing means provides trajectory control during a first predetermined period after release by said carrying means of said vehicle from said carrier aircraft, and said first and second thrust means provide trajectory control after said first predetermined period.

42. A rocket booster vehicle as set forth in claim 41, further comprising detachment means for separating said wing means from said first stage.

43. A rocket booster vehicle adapted for launch by being released from a carrier aircraft while in flight, comprising:

at least first and second thrust means for propelling and providing trajectory control of said vehicle;

wing means for providing aerodynamic lift and trajectory control for said vehicle during a powered phase of its trajectory; and carrying means for releasably carrying said vehicle with said carrier aircraft;

at least first and second stages carrying said at least first and second stage thrust means, respectively, said wing means being secured to said first stage;

detachment means for separating said first stage and said wing means from said second stage; and wherein said wing means provides trajectory control during a first predetermined period after release by said carrying means of said vehicle from said carrier aircraft, and said first and second thrust means provide trajectory control after said first predetermined period.

44. A rocket booster vehicle as claimed in claim 3, 35, 41 or 43 wherein said at least first and second stages are axially aligned.

45. A rocket booster vehicle as claimed in claim 3, 35, 41 or 43 wherein said at least first and second stages both are integral parts of said rocket booster vehicle.

46. A rocket booster vehicle as claimed in claim 1, 3, 11, 35, 41, or 43 wherein all stages of said rocket booster vehicle are unmanned.

47. A rocket booster vehicle as set forth in claim 1, 41 or 43, wherein said first predetermined time period is determined as the time period beginning at release from said carrier aircraft and ending when aerodynamic control becomes substantially ineffective.

* * * * *

UNITED STATES PATENT AND TRADEMARK OFFICE
CERTIFICATE OF CORRECTION

PATENT NO.   :   4,901,949
DATED        :   February 20, 1990
INVENTOR(S)  :   ANTONIO L. ELIAS It is certified that error appears in the above-identified patent and that said Letters Patent is hereby corrected as shown below:

Column 2, Line 41 "are" should be --area--;

Column 4, Line 63 "described" should be --describe--.

Column 6, Line 13 "Additionall" should be --Additionally--.

Column 9, Lines 57 - 60 should be moved and inserted after line 28 in column 9.

Signed and Sealed this

Sixth Day of August, 1991

*Attest:*

HARRY F. MANBECK, JR.

*Attesting Officer*   *Commissioner of Patents and Trademarks*